United States Patent [19]

Peck et al.

[11] Patent Number: 4,534,023
[45] Date of Patent: Aug. 6, 1985

[54] PLURAL COMMUNICATION CHANNEL PROTOCOL SUPPORT SYSTEMS

[75] Inventors: Stephen R. Peck, Boulder; John B. Sharp, Denver, both of Colo.

[73] Assignee: AT&T Information Systems Inc., Holmdel, N.J.

[21] Appl. No.: 539,813

[22] Filed: Oct. 7, 1983

[51] Int. Cl.³ ............................................. H04Q 11/04
[52] U.S. Cl. ...................................................... 370/58
[58] Field of Search .......................... 370/58, 66, 110.1; 179/18 ES

[56] References Cited

U.S. PATENT DOCUMENTS 4,281,410  7/1981  Agricola et al. ................... 370/110.1
4,417,335 11/1983  Kelly et al. .............................. 370/58

OTHER PUBLICATIONS

"GTD-5EAX-Digital Remote Units" by Anderes et al., GTE Automatic Electric Journal, Jan.-Feb. 1981, pp. 8-15.
"Frame-Mode Customer Access to Local Integrated Voice and Data Digital Networks", *IEEE 1979 International Conference on Communications,* Accarino et al., Jul. 1979, pp. 38.5/1–7.

*Primary Examiner*—Douglas W. Olms
*Attorney, Agent, or Firm*—Donald M. Duft

[57] ABSTRACT

Protocol support and message buffering circuitry is used to transmit call status, control and terminal management information bidirectionally over associated conductor pairs as signalling messages between a system processor and a phone and/or terminal served by the system and connected to each conductor pair. This information is transmitted serially in a modified HDLC format as a one bit signalling field of a multiplexed data frame. At each transmitting end, the message information is converted from a parallel to a serial format, transmitted serially as the signalling bit of successive frames, and reconverted to parallel at the receiving end.

Ports terminate the system end of the conductor pairs and are mounted four to the board. Each board contains circuitry, such as registers and the like, common to the signalling message protocol support and message buffering circuitry of all four ports. The processor scans, reads and writes these common registers via the I/O bus to determine the status of each port and to exchange messages with the remote phones and terminals served by the ports. Multiplexing is used on the signalling message so that the system processor can direct a message individually to each of the plurality of station devices connected to the station end of each line. Protocol support is carried through to the processor to support the error detecting capabilities of the protocol.

27 Claims, 10 Drawing Figures

DCP FRAME FORMAT

HDLC FRAME FORMAT

FIG. 8  I/O BUS ADDRESS MAP

|  |  | DATA SELECT | | | | | | | | ADDRESS BITS 3-0 | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| 0 | SCAN DATA | CNTL A | STATUS A | R/W BUFFER A | | | | | | | | | | | | |
| 1 | | | | | | | | | | | | | | | | |
| 2 | | CNTL B | STATUS B | R/W BUFFER B | | | | | | | | | | | | |
| 3 | | | | | | | | | | | | | | | | |
| 4 | | CNTL C | STATUS C | R/W BUFFER C | | | | | | | | | | | | |
| 5 | | | | | | | | | | | | | | | | |
| 6 | | CNTL D | STATUS D | R/W BUFFER D | | | | | | | | | | | | |
| 7 | | | | | | | | | | | | | | | | |

ADDRESS BITS 6-4 / PORT SELECT

ADDRESS BITS ACTIVE HIGH FOR SOFTWARE (ACTIVE LOW FOR PORT HARDWARE)

ADDRESS:

LCN: LOGICAL CHANNEL - SIXTEEN LOGICAL CHANNELS AVAILABLE. LCN=14 DECIMAL CORRESPONDS TO S1 AND LCN=15 CORRESPONDS TO S2.

C/R: COMMAND RESPONSE BIT - 1 = COMMAND
                                             0 = RESPONSE

E/A: SET TO ONE TO INDICATE EXTENDED ADDRESSING IS NOT DESIRED.

PLURAL COMMUNICATION CHANNEL PROTOCOL SUPPORT SYSTEMS

TECHNICAL FIELD

This invention relates to a data transmission system and, in particular, to protocol support facilities for a data transmission system.

BACKGROUND OF THE INVENTION

Both data processing and digital communication switching systems send data over communication lines to a system processor. In data processing systems, data is transmitted between a plurality of terminal devices and the processor for processing. In communication switching systems, data is transmitted between telephones, or other terminal devices, and the switch processor for call control purposes.

In each type of system, data can be sent over a plurality of lines in the HDLC format to the processor. Each line terminates at the processor end in an interface or port which interfaces the communication line to the processor. In data processing systems, the number of lines is often small (100 or less), relative to intermediate or large sized communication systems, and the cost of the terminal devices is relatively high ($1000 or more). Thus, the cost of the ports that terminate each line can be relatively expensive without unduly increasing system costs. The message traffic per line can be relatively high because fewer lines connect to the processor. Also, since the typical data processing system has a hundred lines or less, the communication line interface circuitry is relatively compact physically. For this reason, it is common practice to support the HDLC protocol of the communication line in the receiving port and to transmit the data portion of each HDLC frame to the processor without protocol support. This can be done with a sufficiently low error rate because of the relatively dense physical system configuration and the resulting close proximity of the processor to all ports.

Conditions are otherwise in communication switching systems. These systems have a large number of lines (often a thousand or more), they have less traffic per line and the telephones or other terminal devices are relatively inexpensive. Since there are a large number of lines, the cost of the ports that terminate each line is an important factor in keeping the cost per line and the cost of the overall system low.

The typical communication switching system is physically larger than the typical data processing system because of the large number of lines and associated ports. This results in the system processor being a significant distance from the ports. One advantage of the HDLC protocol is its capability to recover from transmission errors. If the HDLC protocol support occurred in the port, its error correction capabilities would not extend to the processor. Therefore, it is desirable to extend the protocol through to the processor in communication switching systems in order to maintain a satisfactorily low data error rate. Also, the function of receiving incoming messages at the ports and transmitting them to the processor must be performed efficiently so as not to burden the real time capabilities of the processor.

In prior art arangements, the communication paths extending from the terminals to the ports transmitted data using the HDLC protocol with each path being terminated by an HDLC formatter chip and a microprocessor within the associated port. The formatter and microprocessor supported the HDLC protocol of each path. The formatter chip performed the conventional functions such as flag detection, flag generation, zero insertion, zero deletion, CRC calculation, serial to parallel conversion in the receiving direction, and parallel to serial conversion in the transmitting direction. The formatter chip supplied the message bytes, one at a time, to the microprocessor which stored the bytes until a complete message was received. The microprocessor supported the procedural aspects of the HDLC protocol such as error control, channel initialization and flow control. The microprocessor buffered each frame before sending it to the system processor.

The above-described arrangement is not totally satisfactory for a number of reasons. First of all it requires a microprocessor per port. This represents a significant increase in system costs in a system having thousands of ports. The above arrangement is also less than ideal since the protocol is terminated before the message information arrives at the system processor. This means that the error recovery and flow control capabilities of the protocol do not function between the port and the processor. While this arrangement reduces the real time burden on the processor, it increases the probability of error since the transmission to the processor does not include the error control mechanisms of a protocol.

A system having a thousand or more ports can be physically large so that there is a significant distance between any one port and the system processor. The probability of error in transmission between a port and the processor is therefore high. Another protocol could be implemented between the ports and the processor to solve this problem, but this would create additional expense and system complexity.

The goal of maintaining HDLC support through to the processor and the goal of minimizing the real time burden on the processor are conflicting. It would be easy to provide a system in which the port sends the entirety of each message, including the protocol support data, through to the processor. This would minimize data errors but would unduly burden the processor with needless work and would limit its real time capability. On the other hand, there are systems in which all protocol information is deleted at the port so that only the data message is sent to the processor. This minimizes the real time burden on the processor, but results in excessive data error rates in large systems due to noise, etc. on the paths connecting the ports and the processor.

It is therefore a problem to provide an economical system in which the terminal data on a plurality of HDLC communication lines are passed by the receiving ports to the processor by expedients which minimize the required processor real time burden but which also provides enough protocol support to minimize data errors.

SUMMARY OF THE INVENTION

The invention is shown embodied in a communication switching system that comprises switching facilities, stations equipped with telephone and data terminals, and communication paths interconnecting the station phones and terminals with the switching facilities. The switching facilities selectively interconnect the various stations in response to "dial" signals generated at each calling station and transmitted over the associated communication path to the switching facilities. The switching facilities also exchange information with the stations to control various system functions such as the lighting and extinguishing of station lamps, the initiation and termination of ringing, etc.

The publication "FRAME-MODE CUSTOMER ACCESS TO LOCAL INTEGRATED VOICE AND DATA DIGITAL NETWORKS," authored by Accorino et al, from the proceedings of the 1979 International Conference on Communications, pages 38.5/1-7, shows a system in which station phones and terminals are connected over multiplexed communication paths to a switching module for the serving of calls between the various stations. As shown in FIGS. 3 and 4 of Accorino et al, each station performs its call serving function by exchanging information in a multiplexed multiframe format with the switching module. Each frame includes an F (Framing field) an S (Signalling) field, and two PCM or I (Information) fields. The F field contains the bit or bits required to specify the beginning of each frame. The S field is a one bit field used for status information. The I fields contain control information as well as the information that is transmitted between the stations connected on a call. Each I field transmits call information for a unique piece of equipment at the associated customer station. Thus, for a station having a telephone and a data terminal, one I field transmits call information for the telephone, the other transmits call information for the data terminal.

Our invention is similar to Accorino et al in it uses a multiplexed frame format having an F, an S, and two I fields to exchange message information between the switching facilities and the stations. As in Accorino et al, the F field is used for framing and each I field transmits information for a unique piece of terminal equipment (phone or terminal) at the associated station. Whereas Accorino et al uses the S field only for status signalling, etc., the S field is used in our invention to transmit signalling and control messages in each direction between the stations and the switching module. A message in a modified HDLC format is generated at a transmitting end as one or more parallel multibit bytes; the HDLC control information is added to the message; it is converted from parallel to serial at the transmitting end; and it is transmitted serially, bit by bit, over the communication path to the receiving end. Each serial message bit is inserted into the S bit of a frame and transmitted to the receiving end along with the bits in the other fields of the same frame. By this means, signalling messages are transmitted in a modified HDLC protocol using the S field of successive frames. The S field bits are converted from a serial to a parallel format at the receiving end so that the same message plus the HDLC control information generated at the transmitting end is available at the receiving end.

On transmissions from a station to the switching module, the S bit messages are received by a port within the module. Each port is unique to a different station and an associated communication path interconnecting the port with the station. The port reconverts the received S bit messages from serial to parallel and transmits them to a control processor of the switching module. The processor receives each message and determines the appropriate system response. The system response may be the initiation of a system further in connection with the serving of the call or the transmission of a return message back to the station.

The protocol support for the S field HDLC communication line is divided between the receiving ports and the system processor. The modified HDLC protocol is supported in sufficient detail through to the system processor so that another protocol does not have to be created by the port to transmit the received message information to the processor. This function is done in such a manner that the processor has a low real time burden to support the modified HDLC protocol. This allows the processor to handle many ports with a low message error rate. Further, a plurality of logical channels on each path may be supported via the addressing capabilities of the modified HDLC S channel protocol. Flow control and error recovery may be accomplished independently on each logical channel to each terminal device.

The S bit signalling messages are encoded at the transmitting end in accordance with a modified HDLC protocol in which flag characters are transmitted in the absence of any message. The flag transmissions are terminated when the transmitter begins a message transmission. The HDLC message frame comprises an information field containing the signalling message, other fields containing address, control and error checking fields as shown in FIG. 4 of Accorino et al. Transparency of message information is maintained by the conventional HDLC zero insertion mechanism.

At the receiving end, the S field serial information is applied to a receive formatter in the port which performs the conventional flag detection, zero deletion, and serial to parallel conversion functions for the received S field information. The receive formatter in the port applies the parallel bits comprising the bytes of each message sequentially to a receive FIFO which has the capacity to store a plurality of multibyte S field messages in a parallel bit format. The formatter adds an extra bit to each message byte as an indication of whether each byte does or does not represent the last byte of a complete message. In addition, the port generates a "data ready" bit which tells the system processor whether a complete S field message is currently stored in the FIFO.

The system processor scans each port for this information by applying an address unique to each port to a system I/O bus together with appropriate control signals. The scanned port detects its address on the I/O bus and transmits signals to the I/O bus indicating to the processor whether or not the port FIFO currently contains a complete message. When a complete message indication is received, the system processor then addresses other portions of the port over the I/O bus to read out the S field information in the FIFO over the I/O bus to the system processor. In addition, other information is supplied to the system processor indicating the state of the FIFO, end of message status, etc.

By the above-described arrangement, the system processor sequentially scans the various ports and distinguishes ports containing complete S field messages from those that do not contain at least one complete message. The processor need only service in detail the ports containing complete messages and can receive a complete message at one time. This permits a more efficient transfer of message information to the processor. This procedure is further refined by virtue of the fact that the ports are mounted four to the board and that a single scan register common to all ports on the board is scanned to indicate whether a plurality of terminal devices multiplexed into each of the ports on the board currently contain a complete message. The particular implementation disclosed provides for a maximum of two terminal devices being multiplexed into each of four ports on a board. Thus, the processor scans all four ports of a board by reading the common scan register to determine the availability of at least one complete message in any port on the board. It then proceeds to scan a port individually only if the common scan register indicates that one or more ports currently contains at least one complete message.

Each S field message transmitted to the system processor contains the bytes of the generated signalling information as well as the support bytes required by the modified HDLC protocol. These bytes are an address field, a control field, the signalling message, and an error checking field. The system processor maintains an independent protocol dialog with each terminal device served by each line. When the system processor transmits a message, the HDLC address field designates the destination device. Similarly, when the system processor receives a message, the address field designates the source of the message. By this means, when the processor receives a message, it analyzes the entirety of the message to determine its error free status, message type, logical channels, sequencing status, etc. The procedural aspects of the modified HDLC protocol and message multiplexing are therefore performed by the system processor while the port deloads it from many of the real time intensive aspects of the protocol such as bit stuffing, framing, etc.

The above-described arrangement is an improvement over and eliminates the problems of the priorly available arrangements since it divides the modified HDLC protocol support function between the ports and the system processor in such a way that it does not require a microprocessor per port. It also minimizes the real time burden on the system processor and preserves the integrity of the data all the way to the system processor. The above-described arrangement also provides a multiplexed HDLC like path directly between a plurality of terminal devices on each port and the system processor. This allows the processor to communicate independently with each of the plurality of terminal devices, such as a telephone and a terminal, served by each line.

BRIEF DESCRIPTION OF THE DRAWINGS

This invention may be better understood by a reading of the followed detailed description with reference to the accompanying drawings wherein:

FIG. 8 discloses the I/O control bus bit address may by means of which the processor communicates with the ports;

DETAILED DESCRIPTION

Figure 1:
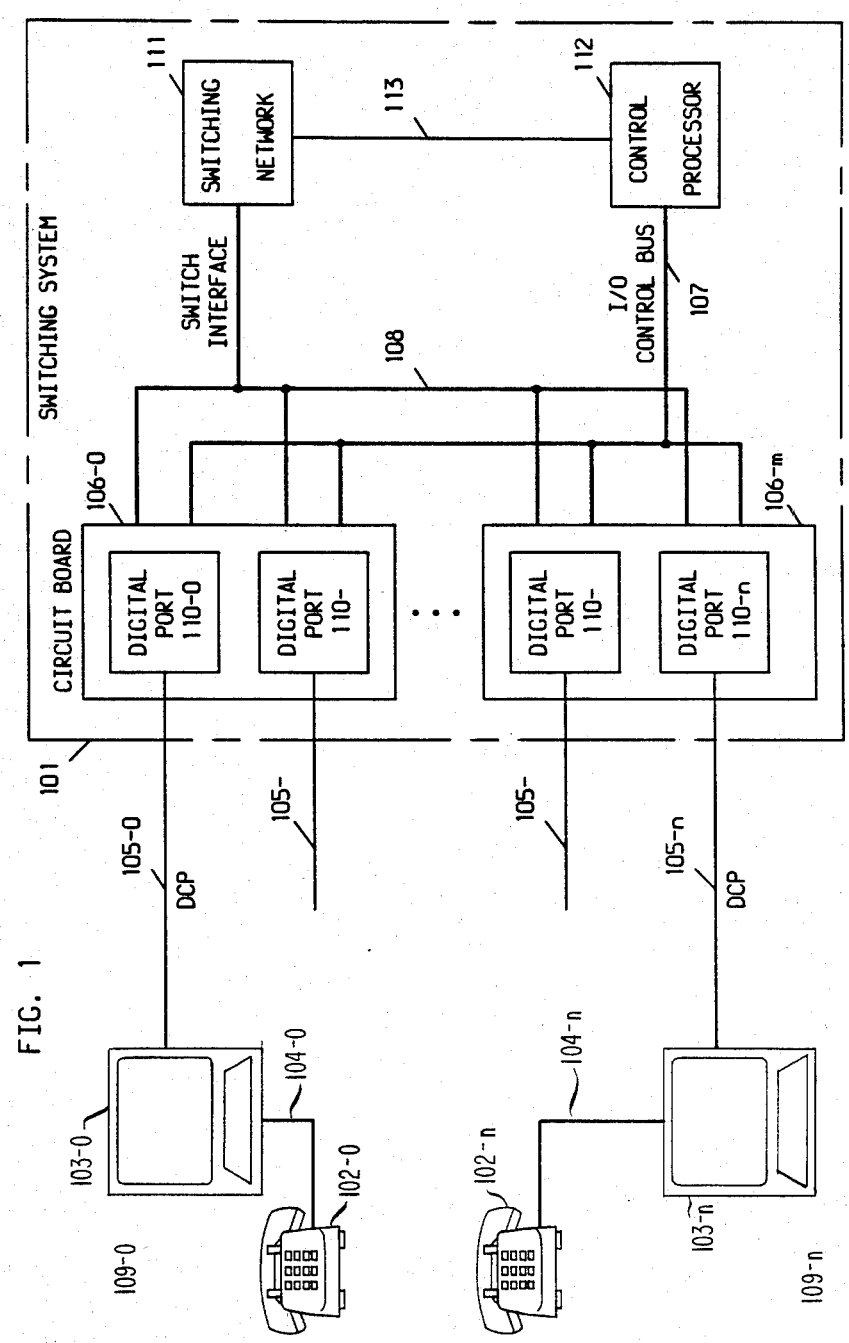
FIG. 1 discloses a system embodying the present invention.

FIG. 1 discloses a communication system embodying the present invention. The disclosed system comprises a switching system 101 interconnected with a plurality of customer stations 109. Each station 109 may comprise a digital telephone 102 connected by path 104 to an associated data terminal 103. Each station is connected to the switching system 101 by means of an associated path 105, such as, for example, path 105-0 for telephone 102-0 and data terminal 103-0.

Switching system 101 comprises ports 110 mounted on circuit boards 106, switching network 111 and a control processor 112. The switching facilities are connected to the ports by means of switch interface 108 which is shown to comprise a bus. The control processor 112 is connected to the ports by means of an I/O control bus 107. Switching network 111 comprises the switching apparatus required to interconnect the ports, signalwise, for the serving of calls. The control processor 112 is advantageously of the stored program control type and controls the operation of the entire system. It controls the operation of the switching network 111 over path 113; it controls the operation of the ports and the customer stations by means of I/O bus 107.

Figure 2:
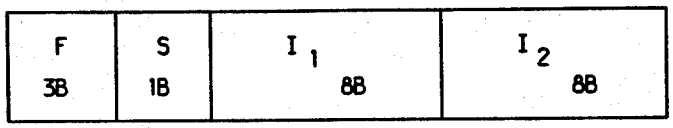
FIG. 2 discloses the Digital Communications Protocol (DCP) frame format by means of which messages are exchanged between customer stations and the disclosed switching system.

Stations 109 and the switching system 101 exchange information in the DCP frame format shown in FIG. 2 during the serving of calls. Each DCP frame comprises twenty bits which are subdivided into a three bit F (Framing) field, a one bit S (Signalling) field, and two 8-bit I (Information) fields. The F field carries the framing information required to synchronize the receiving facilities with the transmitted messages. The S field is used to transmit signalling messages in the HDLC protocol in each direction between the control processor 112 and the customer stations 109. These messages, as subsequently described, specify various system operations that are initiated and controlled by processor 112 on transmissions from the switching system 101 to the customer stations 109. These messages also contain station request and status information on transmissions from the stations 109 to processor 112. The two I fields independently transmit information comprising the subject matter of a call between the stations involved on the call. The I1 field on path 105-0 may be assigned, for example, to transmit call information from the phone 102-0 of station 109-0; the I2 field of path 105-0 may be assigned to transmit call information from the data terminal 103-0. Phone 102-0 and terminal 103-0 can concurrently be connected to different called stations.

Figure 3:
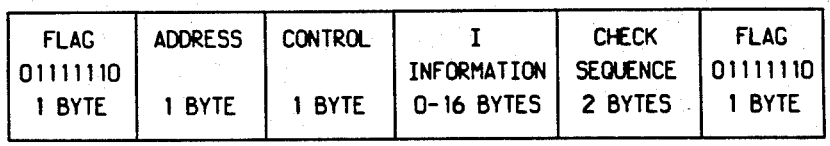
FIG. 3 discloses the HDLC frame format by means of which the S bit messages are transmitted in the S field of DCP frames.

The S field messages are generated as parallel multibit messages at the transmitting end, such as, for example, at customer station 109-0. They are then converted from parallel to serial, encoded into the HDLC frame format of FIG. 3, and transmitted serially over path 105-0 to the receiving end, such as, for example, digital port 110-0. Prior to this transmission, the flag bytes of FIG. 3 are inserted to separate each message. Also, when no S field messages are being transmitted, the transmission circuitry generates and transmits continuous flag characters having the bit pattern of FIG. 3.

Each modified HDLC frame comprises, in addition to a flag character, one 8-bit byte as an address character, one 8-bit byte as a control character, and a variable number (0 through 16) of 8-bit bytes of signal information comprising the actual S field signalling messages transmitted from the station to the processor or vice versa. The remainder of the frame includes a two byte check sequence which is inserted for error correction and detection purposes. The right hand flag character on FIG. 3 separates the message from any subsequent message. The transmission circuitry at each end and the associated receiving circuitry also perform the conventional HDLC zero insertion and deletion functions to provide transparency of message information. That is, no bit pattern within a message can be the same as that of a flag character.

The DCP frames shown in FIG. 2 are received, as well as generated, by each port at all times. The two I fields contain the received call information that is to be transmitted to the other port circuit and, in turn, the associated customer station involved on the call. The information in these fields is transmitted by the receiving port 110 over the switch interface 108 to the switching network 111. Network 111 may be, for example, a time slot interchanger that functions to connect a first port with a second port. The switch interface faciities 108 comprise time division buses in which the I field information for a first port is transmitted from that port in an assigned time slot to the switching network 111. Network 111 performs a time slot interchange function and applies the received information from a first port back to the bus 108 in the time slot assigned to the other port involved on the call. This other port receives the I field information and transmits it over the associated communication path 105 to the associated customer station 109 as part of the I field data messages transmitted from the second port to its called station. Network 111, switch interface 108, and the manner in which the I field information is received by one port and transmitted via network 111 to another port comprises no part of the present invention and therefore are not discussed in further detail.

Figure 9:
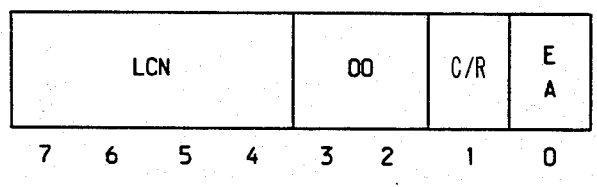
FIG. 9 discloses the modified HDLC address field of our invention.

The digital ports 110 receive, in consecutive DCP frame transmissions, the S bit signalling messages in the modified HDLC format of FIGS. 3 and 9. A single S bit is received during each DCP frame and the transmission of an entire HDLC message is accomplished during the transmission of the number of consecutive DCP frames equal to the number of bits in the HDLC frame of FIG. 3. This number is variable due to the fact that the I field of an HDLC message may contain anywhere from 0 to 16 bytes and also due to the zero insertion mechanism.

The S bit receiving circuitry of the digital port receives the modified HDLC frame messages over path 105 and performs the conventional flag detection function. It also performs a zero deletion function on all bytes other than the flag bytes. It then transmits the address, the control, the I, and the check sequence bytes to the circuitry of the present invention. These bytes are transmitted by means of the subsequently described facilities to processor 112. Processor 112 receives these bytes, anaylzes the contents of the address, control, check sequence, and I fields to determine the identity of the source terminal and the nature of the message, and then determines the action it is to take in response to its receipt of the message. The response taken by the processor may vary from no action at all to the generation of a new message which is transmitted over the I/O bus 107 via a port to a station 109 to initiate a function at the telephone 102 or terminal 103 of the station. Typical functions may be the lighting or extinguishing of a lamp, the initiation or termination of ringing, etc. The address field of FIGS. 3 and 9 represents the address of a device (phone or terminal) at the customer station that sent a message received by a port 110 over path 115. The control field represents information indicating the function of the I field message, if any. The check sequence field is used for error control purposes.

Processor 112 scans all ports 110 via bus 107 to determine whether an S field message is currently waiting at the port to be transmitted to the processor. The processor takes no action, other than scanning, for the ports containing no messages. Ports containing messages are addressed by the processor to read out the one or more messages that may be contained within the port. This scan and read out function is performed by the processor at a sufficiently fast rate to prevent any incoming messages from overflowing and being lost within the port. The processor also works in the reverse direction to transmit messages selectively to the various ports for transmission to their associated stations. These messages are transmitted at a rate required to maintain the operation of the system and to prevent any messages from overflowing in that direction within the port.

DETAILED DESCRIPTION, FIG. 4

Figure 7:
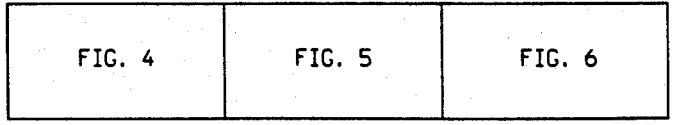
Figure 4:
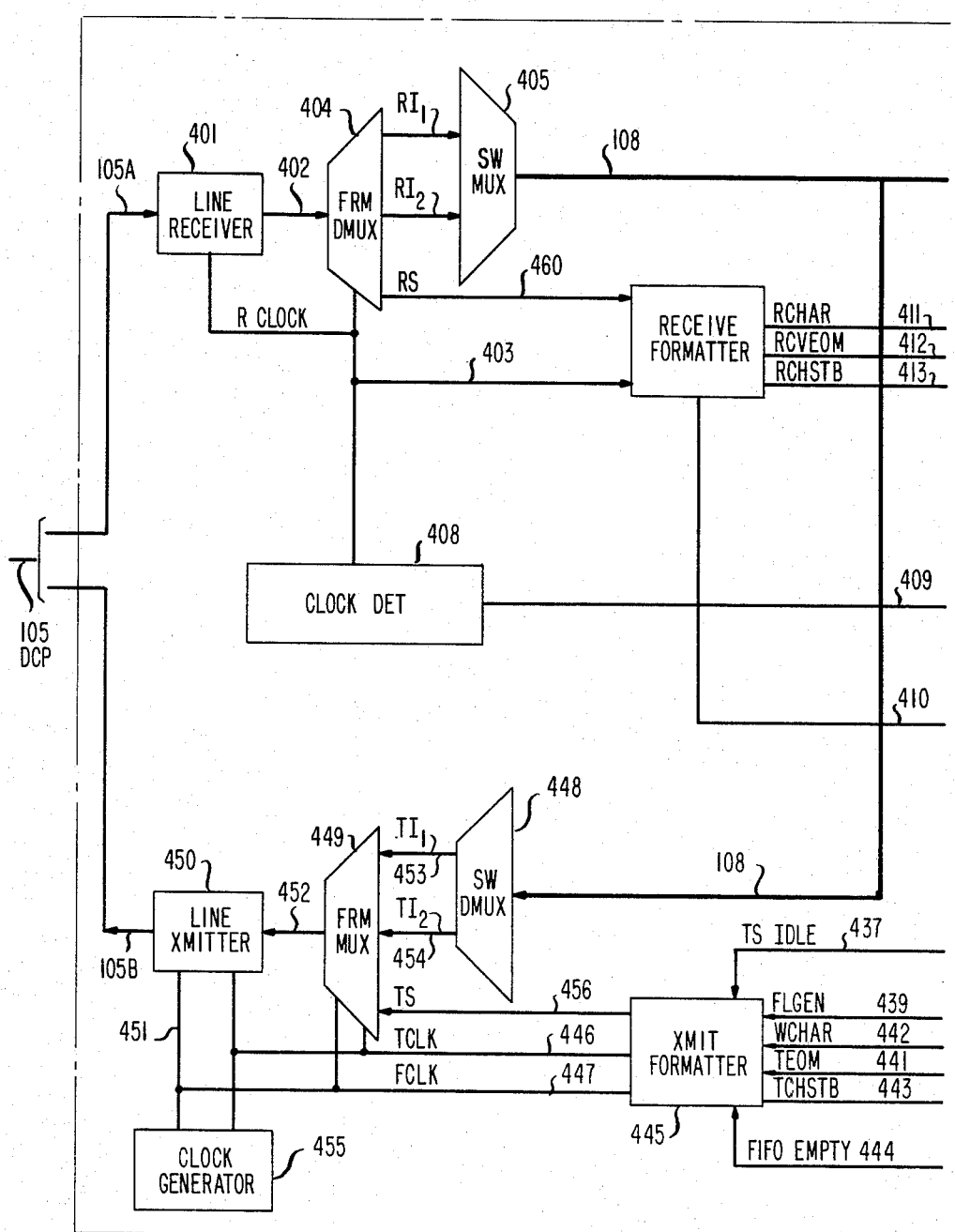
FIGS. 4, 5, and 6, when arranged as shown on FIG. 7, disclose further details of the invention.
Figure 5:
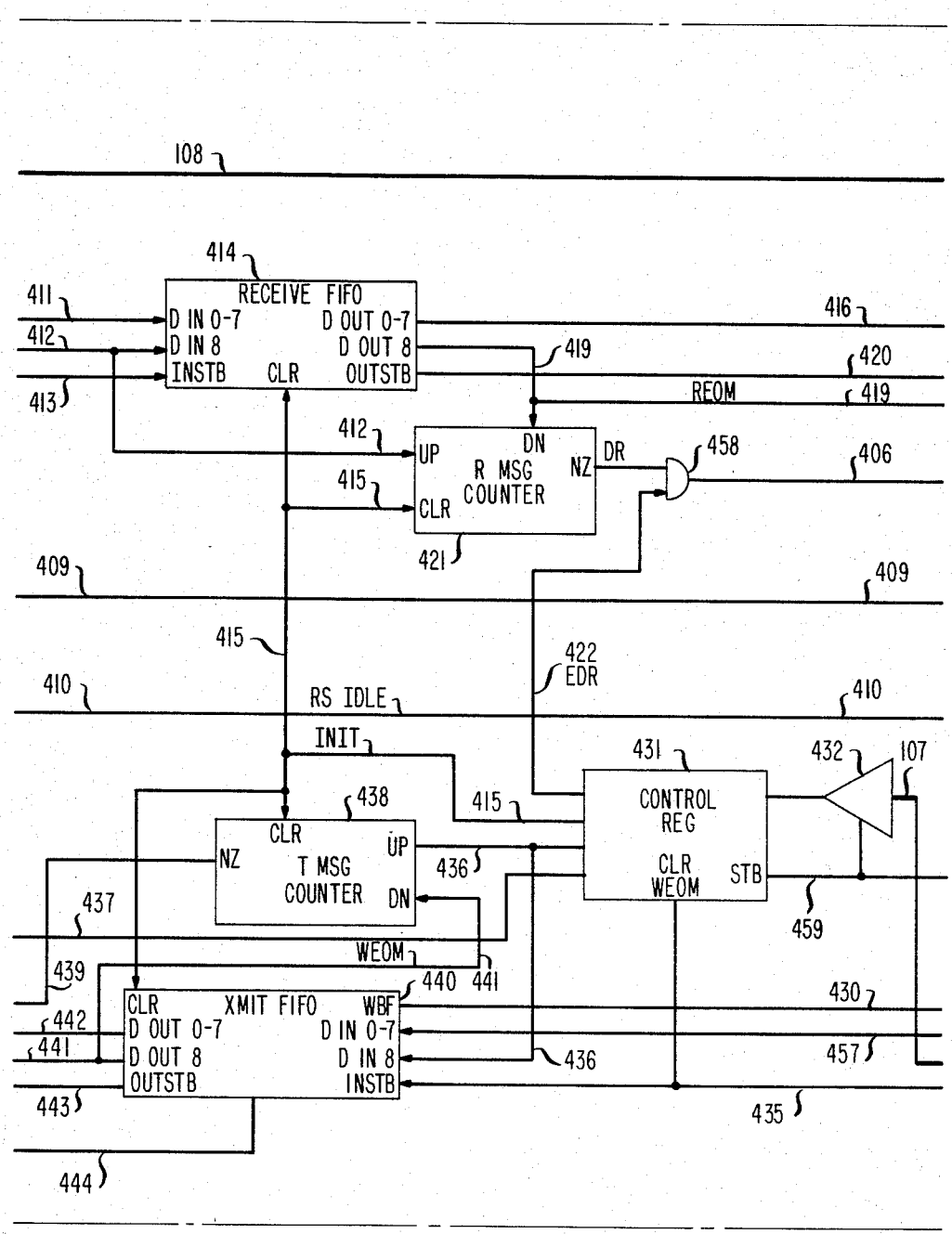
Figure 6:
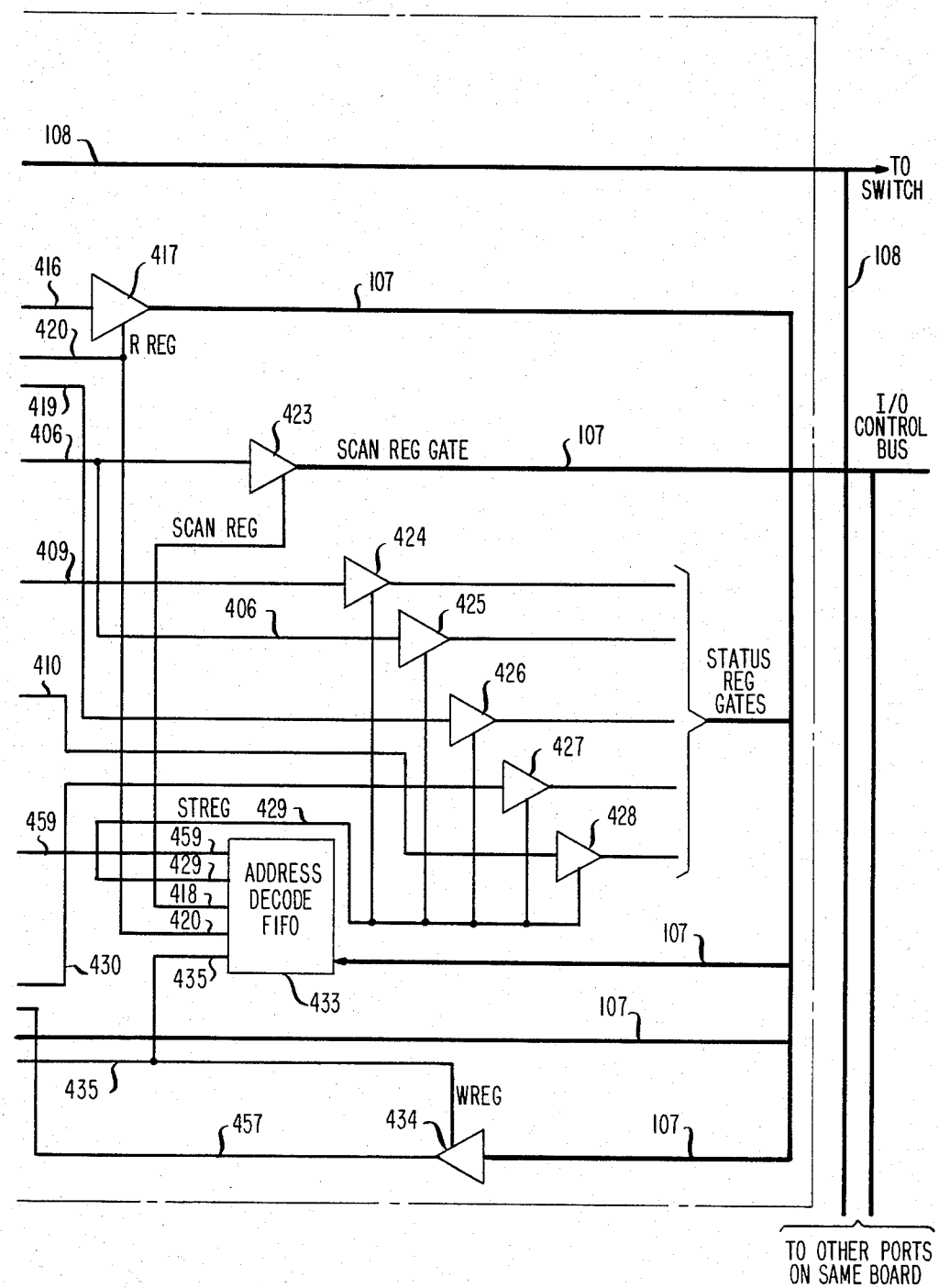

FIGS. 4, 5, and 6, when arranged as shown in FIG. 7 disclose further details of the system of FIG. 1. In particular, FIGS. 4, 5, and 6 disclose further details of a digital port 110 with emphasis upon the port circuitry associated with the reception and generation of S bit signalling messages. The port of FIGS. 4, 5, and 6 exchanges call information with its associated customer station equipments via the path 105. This call information is in the DCP frame format shown in FIG. 2.

The DCP path 105 comprises a 160 kilobit per second data link. The 160 kilobit rate results from the fact that 20 bit frames as shown in FIG. 2 are transmitted over path 105 at an 8000 hz rate. Alternate bipolar modulation is used to transmit the data signals and the modulation rules are violated once each frame to provide a frame rate synchronization signal for the receiving circuitry.

The operation of the receiving portion of the port is first described. Call information is received in the DCP frame format and applied over path 105 to line receiver 401. The line receiver derives its synchronization from the F field of each received frame and passes the remaining fields, namely the S field and the two I fields in serial form, to frame demultiplexor 404 over path 402. The synchronization circuitry of the line receiver generates a receive clock signal and applies it over path 403 to the control portion of demultiplexor 404 as well as to the receive formatter 407 and the clock detector 408.

The line receiver functions with respect to the received signal by separating it from the noisy environment of the communication line 105 and by transforming it into a logic level signal that is applied to the input of demultiplexor 404. The demultiplexor 404 demultiplexes the S field and the two I fields. The information in the two I fields comprises the subject matter of calls involving the phone and the data terminal at the associated customer station. This call information is extended over paths $RI_1$ and $RI_2$ to multiplexor 405 which multiplexes the signals together and places them on the switch interface path 108. This interface comprises a time multiplexed bus. Each I field occupies a different time slot on the multiplexed bus and thus the information in each I field is transmitted out sequentially during each occurrence of its associated time slot. This information is applied to the time slot interchange facilities of the system which performs a conventional time slot interchange function and interconnects each I field with the port to which the call is directed. This invention is not concerned with the processing or switching of the I field information and therefore it is not described herein in further detail. The interface from the switch multiplexor 405 to the bus 108 contains both data and clock signals to control the switch multiplexor 405 and the switch demultiplexor 448.

The S field information comprises one bit of the frame of FIG. 2 and is applied over path 460 to the receive formatter 407. At this point, path 460 comprises an eight kilobit per second serial channel carrying the S field information. The receive formatter performs the customary flag detection operation on this signal. That is, it looks for a pattern of a 0, followed by six 1's and a 0, as shown on FIG. 3, and synchronizes to that pattern as long as the flags appear on path 460. As soon as it detects a nonflag sequence, as is the case when a signalling message character is received, it begins to perform a serial to parallel conversion on each nonflag byte. During the time when nonflag characters are being received, it performs a conventional zero delete function whenever it detects a sequence of five ones followed by a zero. It does this in accordance with the HDLC protocol in order to prevent a message character from being construed at the reception of a flag character. The receive formatter, while it is performing this serial to parallel conversion on nonflag characters, also detects the reception of a flag character at the end of each message. It then generates a signal that is applied to path 412 to specify the end of message for the received character. This path is also termed RCVEOM (Receive End Of Message). The receive formatter applies each character after it is formed into a parallel format to path 411 and from there to the receive FIFO 414. The receive formatter also generates a signal that is applied to path 413 to control the strobing of information into FIFO 414. The signal on path 413 appears when the signals on paths 411 and 412 are valid so that they then can be strobed into FIFO 414.

The receive FIFO 414 is organized as a 48 word, nine bit per word FIFO. The nine bits in each word are the eight bits representing the received character on path 411 and a one bit "end of message" signal on path 412 indicating whether or not each receive character does or does not represent the last character of a message. The characters that are applied to the input of the FIFO pass through in the conventional manner to the output of the FIFO. The eight character bits are applied over path 416 to the tri-state gates 417. The end of message signal associated with each character is applied over path 419 to counter 421. The end of message signal is true only when the character is indeed the last character of a message and, at that time, the signal increments counter 421 by a count of one.

Tri-state gates 417 are enabled by a read register signal on path 420. This signal is generated by the control processor 112 and applied over the control bus 107 when the processor wishes to read the contents of FIFO 414. The processor effects this operation by applying a unique address signal over bus 107 to address decoder 433 to cause it to generate an output on path 420 extending to FIFO 414 and gates 417. Each port, including the port shown on FIGS. 4, 5, and 6, is assigned a plurality of I/O bus addresses. The various addresses represent the various functions of which the port is capable. A particular function is initiated by the application of the associated I/O bus address to the decoder 433. Accordingly, in order to read out a character from the FIFO, the processor applies the port address associated with path 220 to the address decoder 433 via the I/O bus. The address decoder responds to this address, drives path 420 true to cause the character at the output of FIFO 414 to be extended over path 416 and through gates 417 to the I/O bus 107. This character is then passed over the I/O bus to the processor which stores it and every other received character until a complete message is formed.

The read register conductor 420 also extends to the OUTSTB terminal of the FIFO 414. The FIFO responds to the trailing edge of this signal and advances the next character stored within the FIFO to the output of the FIFO so that it can be read on the next read register operation. Thus, the read register signal on path 420 performs two functions. The first is to enable gates 417 to pass the character currently on the FIFO output over path 416, through gates 417 to the I/O bus 107. The trailing edge of the read register signal on path 420 advances the next character within the FIFO to the output of the FIFO.

The ninth bit in the FIFO is the END OF MESSAGE bit on path 419. This signal performs two functions. The first function is to provide a READ END OF MESSAGE signal to the input of the status gate 426. This gate can be read by processor 112 when it performs a READ STATUS REGISTER function on the port. This register has a unique address and when the processor applies this address to the I/O bus, the address is decoded by decoder 433 which applies an enable signal over path 429 to activate the status registers. This applies the true bit on path 419, if present, through gate 426 to the I/O bus for transmission to the processor. The enabling of path 419 enables all of the status register gates 424 through 428.

The second function of the READ END OF MESSAGE signal bit on path 419 is to decrement the counter 421. The counter 421 at any time has a count in it that indicates the number of messages currently stored within the FIFO 414. The counter is incremented by a RECEIVE END OF MESSAGE signal on path 412 and is decremented when a READ END OF MESSAGE signal is read out of FIFO 414 on path 419. Thus, the current count of counter 421 represents the number of complete messages currently stored within FIFO 414. The output of counter 421 on path DR is true whenever the counter is in a non-0 state. This is the signal which permits a DATA READY indication to be read by the processor as it scans the status gates. The DR signal is extended through gate 458 when path 422 is enabled and from there the signal extends over path 460 to the input of the scan register gate 423 and to gate 425.

The processor 112 can read either the scan register gate 423 or the FIFO 414 by applying the appropriate addresses to the I/O bus. The address for either of these is decoded by decoder 433. The appropriate output of the decoder is enabled to activate the appropriate tri-state gate, such as 423 or 417, to allow data to be applied to the I/O bus 107.

Processor 112 can generate and write messages into the port of FIGS. 4, 5, and 6 for transmission to the station served by the port. It does this by utilizing the write portion of the port. The first step processor 112 performs on a port write operation is to determine whether transmit FIFO 440 is full and is able to accept the message. If FIFO 440 is not full, processor 112 writes its message into the port. It writes the first byte of the message into the port. The processor performs this function by first applying the appropriate address signal to the I/O bus. The signal that is applied is that which is associated with the write portion of the port. The decoder 433 decodes this address and generates the WREG signal on path 435. This signal enables the tri-state gates 434 which allow the message information now on the I/O bus to be extended through gates 434 and over path 457 to the input of FIFO 440. This signal on path 435 is also applied to the INSTB input of the FIFO to strobe into the FIFO the message information currently on path 457.

Also strobed into the FIFO 440 at this time is a ninth bit, a WRITE END OF MESSAGE bit, which is applied to FIFO 440 over path 436. This signal indicates that the character associated with this bit is the last character of a transmitted message. Processor 112 sequentially writes each character of a message into FIFO 440. Just before the last character of the message is to be input into FIFO 440, processor 112 writes into control register 431, via gate 432 and path 459, to generate a WRITE END OF MESSAGE signal on path 436. This signal is strobed into the FIFO at the same time the last byte of the message is strobed via the WREG signal on path 435. The signal on path 436 is automatically reset after the last byte is written into the FIFO by the trailing edge of the WREG signal on path 435.

The transmit FIFO 440 is organized as a 49 word by nine bits per word FIFO. Eight bits of the nine represent the character information; the ninth bit of each word represents the absence or presence of a WRITE END OF MESSAGE signal. The transmit FIFO 440 has a write buffer full output termed WBF. When all 48 words in a FIFO are filled, the WBF signal goes true and is extended over path 430 to status register gate 427. This gate is periodically read by the processor prior to writing FIFO 440. When FIFO 440 is full, the output of gate 427 is true to advise the processor that the FIFO can accept no more bytes for the time being. If the FIFO is detected to be full in the middle of writing a message, the system processor will queue the remainder of the message and throttle the load until a previously loaded message is transmitted and the FIFO becomes sufficiently empty to accept at least one more byte.

The outputs of FIFO 440 are applied to paths 441 and 442. Path 442 carries eight bits representing character information, path 441 is an END OF MESSAGE bit. FIFO 440 receives a strobe signal from the transmit formatter 445 over path 443. The character information on path 442 and the END OF MESSAGE signal on path 441 are applied to the input of a transmit formatter 445. The transmit formatter normally continuously generates and sends out flag characters on the channel to the associated customer station as long as there are no messages in FIFO 440. At such times, the formatter sequentially generates a flag character of 0, six 1's and a 0. Whenever the FIFO 440 is not empty, the transmit formatter 445 begins the process of unloading the characters from FIFO 440 and transmitting them out over the S channel. It does this by performing a parallel to serial conversion on the received characters and the zero insertion function required for transparency. Thus, the transmit formatter first sends out flag characters when it determines from transmit FIFO 440 over path 439 that the FIFO is not empty, then, at the end of transmission of the flag character, the formatter 445 generates a strobe signal that is applied over path 443 to FIFO 440. This signal is used internally by the formatter to load the character information on path 442 and any END OF MESSAGE signal on path 441 into the formatter. The trailing edge of this strobe signal is also used to advance the FIFO to bring the next character in the FIFO to the FIFO output.

The transmit formatter performs a parallel to serial conversion on the received information. It also performs a zero insertion function when it is sending non-flag characters out over path 446. That is, if the transmitted bit stream of the message has five consecutive 1's, formatter 445 inserts a 0 between the fifth-1 and the next bit transmitted. Thus, the transmit formatter 445 transmits out each character it receives and it checks the END OF MESSAGE bit associated with each character. When the last character in a message is received from FIFO 440, path 441 is set to a 1. This tells the formatter that this character is the end of a message and causes the formatter to insert a flag after this character. Formatter 445 does this and then checks for a transmit empty signal on path 444. If the empty signal is true, the formatter continues to generate and transmit flags. If the empty signal is not true, the formatter then reads the next character out of FIFO 440. This new signal is a first character of a subsequent message. It processes any such first characters of the subsequent message, and all other characters of that subsequent message, in a manner similar to that already described.

The processor 112 can write an initialize bit into the control register 431. This bit is on path 415 and it causes the FIFOs 414 and 440 to be cleared as well as the END OF MESSAGE counter 421 and 438. This effectively removes all information from the port.

The disclosed circuitry of FIGS. 4, 5 and 6 uses the status register gates 424 through 428 and the control register 431 to exchange miscellaneous types of status and control signals between the port and processor 112. The receive formatter 407 applies a signal over path 410 to status register gate 428. This signal represents a SIGNALLING CHANNEL IDLE function. It is generated by the receive formatter 407 when fifteen or more consecutive 1's are received on the S channel, as is standard in the HDLC protocol. This signal is used to indicate when equipments at the associated customer station are not active or operable. The normal state of the DCP line 105 is that either flag characters or data or both are transmitted to the port. A continuous stream of flag characters signifies that the associated customer equipments are ready to receive or transmit information. This is termed an active idle state. When the associated customer station transmits continuous 1's, this indicates a lack of flag characters and that the associated equipment is not currently ready to communicate with the port. The customer equipments could, for example, generate an all 1 signal when the equipment is being tested by local facilities and therefore unavailable to otherwise communicate with the port and processor 112. In summary, the all 1's signal indicates that the equipment is attached to the DCP line 105 but that it is currently unable to communicate further with the port or the processor.

Path 437 interconnecting transmit formatter 445 with the control register 436 performs a similar function for the transmit portion of the port circuit. This permits the processor to write to the control register 431 that activates path 437. A true signal on this path causes transmit formatter 445 to generate and transmit a continuous stream of 1's to the associated customer equipment. This stream of 1's tells the customer equipments that the processor is currently unavailable for communication over the signalling channel.

Path 409 interconnects the clock detector 408 with status register gate 424. Clock detector 408 normally receives clock pulses on path 403 from line receiver 401. At such times, clock detector 408 applies a 0 over path 409 to register gate 424. This permits the processor, when reading the gates, to determine that clock pulses derived from the received data stream are being received over the DCP line 105 by line receiver 401 and applied over path 403 to detector 408. This is the normal operable state of the system. If, for any reason, the line receiver fails to receive a data stream, detector 408 receives no clock pulses and sets path 409 equal to a 1 to permit the processor to read gate 424 and determine this condition. This condition could exist for example when the associated customer equipment is disconnected from DCP line 105.

Path 422 interconnects the lower input of AND gate 458 with control register 431. This path is normally held in an enabled state by the control register. This enables gate 458 and permits the DR output of counter 421 to be extended over path 406 to scan register gate 423. This DATA READY signal is used to advise the processor that at least a single message is currently contained within receive FIFO 414. Trouble conditions may occur in which the port is inoperable but yet attempts to apply a DATA READY signal over path 406 to scan register gate 423. This condition would cause the processor to assume that the port contains a message even though it is currently inoperable. The control register can be controlled by processor 112 to apply a disable signal to path 422 to disable gate 458 to prevent the processor from repeatedly attempting to read messages out of the port when, due to trouble conditions, no such messages exist.

The address decoder 433 contains flip-flops so that when an address is applied to the I/O bus together with appropriate control signals by processor 112, these control signals latch the address into the decoder flip-flops. The output of these flip-flops extends to circuitry which decode the address and give output signals unique to each different address. One of these output signals extends to path 459. This signal is active at the time that data appears on the I/O bus 107 and is used to strobe the data into latches in the control register 431. That data is persistent because it is latched into the control register. Control register 431 contains flip-flops which store the state of the port, as controlled by the system processor, as subsequently described.

Transmit message counter 438 functions similarly to receive message counter 421 to indicate whether FIFO 440 currently contains a complete message. Counter 438 is incremented over path 436 when a message is entered into FIFO 440. Counter 438 is decremented over path 441 when a message is read out of FIFO 440.

The output of transmit formatter 445 extends over path 456 to the frame multiplexor 449. Switch demultiplexor 448 receives PCM time slot signals on time slot bus 108, separates out the I1 and the I2 field signals for this port from their assigned time slots and applies them to paths 453 and 454. An output of counter 438 extends to transmit formatter 445 on path 439 which indicates when the counter is zero. This implies that no messages are contained in FIFO 440 and that formatter 445 should generate flag characters.

The I1, I2 signals are received by the frame multiplexor 449 together with the serialized S channel bits on path 456. Once each frame, multiplexor 449 inserts the eight bit I1 field, the eight bit I2 field and the one bit S field onto a framing signal and applies it over path 452 to the line transmitter 450 which adds the F field bits. From there, the resultant twenty bit frame of FIG. 2 is extended over path 105B and 105 to the associated station 109.

Line transmitter 450 and frame multiplexor 449 operate under control of the output signals from clock generator 455. Switch demultiplexor 448 receives its control signals from time slot bus 108.

FIG. 8 illustrates a manner in which address and control signals are transmitted over the I/O bus to read information out of and to write information into the ports. Each port board 106 contains four ports 110 and each port can serve two calls simultaneously. One call is served by the I1 field of the port. The other is served by the I2 field. With each port having two I fields, the four ports on a board collectively have eight I fields and can serve eight call connections simultaneously. The system processor supports two logical channels designated SI and S on each port. Thus, collectively a board supports eight independent control channels to each of eight terminal devices served by the four ports of a board. Thus, there is an independent control path for each independent call device.

Each port is associated with two rows on FIG. 8. Port 0 of a board may be associated with rows 0 and 1, port 1 with rows 2 and 3, port 2 with rows 4 and 5, and port 3 with rows 6 and 7. Each port has a plurality of registers. Each register is assigned a different column on FIG. 8.

Processor 112 communicates with a port and its registers of FIG. 8 by first applying an eight bit address signal to the I/O bus specifying the board, the port, and the register of the port with which the processor wishes to communicate. This address signal is followed by an 8 bit signal containing the information to be written into the port or read from it. Thus, to write into the control register 431 of port 0, processor 112 applies to the I/O bus an eight bit address signal that specifies the board on which the port is located, the port number and an identification of the control register. For port 0, I/O address bits 4 to 6 are used to specify a port number of 0, I/O address bits 0 to 3 are used to specify the control register of column 1 on FIG. 8. The eighth bit used for parity. The board select circuitry is not shown since it is not relevant to the present invention. The address decoder 433 responds to the address signal specifying port 0 and applies a signal over path 459 to prime control register 431 which is shown in column 1. Once the control register shown in row 0 and column 1 for port 0 has been addressed, an eight bit byte is then sent over the I/O bus to transmit the desired control information via gates 432 and over path 461 to the control register.

The scan data register shown in row 0 and column 0 is common to all four ports on a board and is scanned by the processor every 10 milliseconds to determine if there is a signalling channel message(s) in any of the ports to be read. Each port controls one bit of the scan register as follows:

Bit 0—Data Ready for Port 0
Bit 2—Data Ready for Port 2
Bit 4—Data Ready for Port 4
Bit 6—Data Ready for Port 6

When a complete message has been received by a port, the bit associated with that port, called the data ready bit, is set to a 1 as counter 421 is incremented. This bit is applied to the scan registergate 423 via gate 458. The next time the processor reads the scan register, it receives the DATA READY bit through the scan gates 423 of the port and associates the data ready bit of one with a particular port. Scan gate 423 on each port on the board actively drives only one bit on bus 107 when the scan register is addressed by processor 112. Thus, the scan register contains composite data ready information from all ports on the board.

The control register in column 1 of FIG. 8 is used by the processor to control the state of an individual port. This register is also readable. The functions of the individual bits of this register are as follows:

Bit 0—Not used for functions pertinent to the invention.

Bit 1—Write End of Message (WEOM). This bit set to "1" on path 436 tells the port that the next character written into FIFO 440 is the last character of a message. WEOM is automatically set to "0" by path 435 in the port when the next character is written into FIFO 440.

Bit 2—Port Initialization (PINIT). This bit on path 415 is set to a "1" to initialize the port. This initialization function clears the FIFOs 414 and 440 and the control register and counters 421 and 438.

Bit 3—Transmit Signalling Channel Idle (TSIDLE). This bit set to "1" on path 437 commands the signalling channel transmit formatter 445 to fill the signalling channel with continuous "1's", which is the idle state defined in the HDLC protocol.

Bits 5 and 6—Not used for functions pertinent to the invention.

Bit 7—Enable Data Ready (EDR). The EDR bit on path 422 is used to prevent a bad port or terminal from sending messages to the processor. Similarly, the system processor can mask or filter messages to or from a terminal device on a logical channel basis. This may be used as an alternative to enabling the EDR bit and therefore disabling the full DCP link. When EDR is set to "0", the DR bits in the scan and status registers are held to a "0" by AND gate 458. That is, incoming signalling channel messages do not generate a Data Ready signal to processor 112. This disable does not clear the Read FIFO 414. Messages received by the port while EDR is "1" are stored in the normal fashion.

The status registers 424-428 enable the processor to determine the state of the port. The processor reads this register at approximately one second intervals unless a signalling channel message transfer is in progress, in which case it is read each time a character is transferred. Port state information is coded into the status registers as follows:

Bit 0—Data Ready (DR). The DR signal of scan gate 425 is identical to the DR bit in the scan register. It is duplicated in the status register to simplify processor software.

Bit 1—Read End of Message (REOM). The REOM signal of gate 426 is set to "1" to indicate that the next character read from FIFO 414 is the last character in a message.

Bit 2—Not used for functions pertinent to the invention.

Bit 3—DTL IDLE (DTLI). Gate 424 is set to "1" to indicate that no data is being received by the port circuit from the terminal. In general this implies that no terminal is connected. It could also indicate that the terminal is powered down, or that the associated wiring is short- or open-circuited.

Bit 4—Not used for functions pertinent to the invention.

Bit 5—Write Buffer Filled (WBF). WBF set to "1" by path 430 indicates that FIFO 440 is full, and that the processor cannot write another character into the FIFO.

Bit 6—Receive Signalling Channel Idle (RSIDLE). This bit set to "1" in gate 428 by path 410 indicates the signalling-channel protocol-support circuitry of formatter 407 is receiving continuous "1's" on the signalling channel. This indicates an idle state on that channel.

Bit 7—Not used for functions pertinent to the invention.

The remaining columns on FIG. 8 are associated with registers that are not currently assigned or have a specialized function of no relevance to the present invention.

Figure 10:
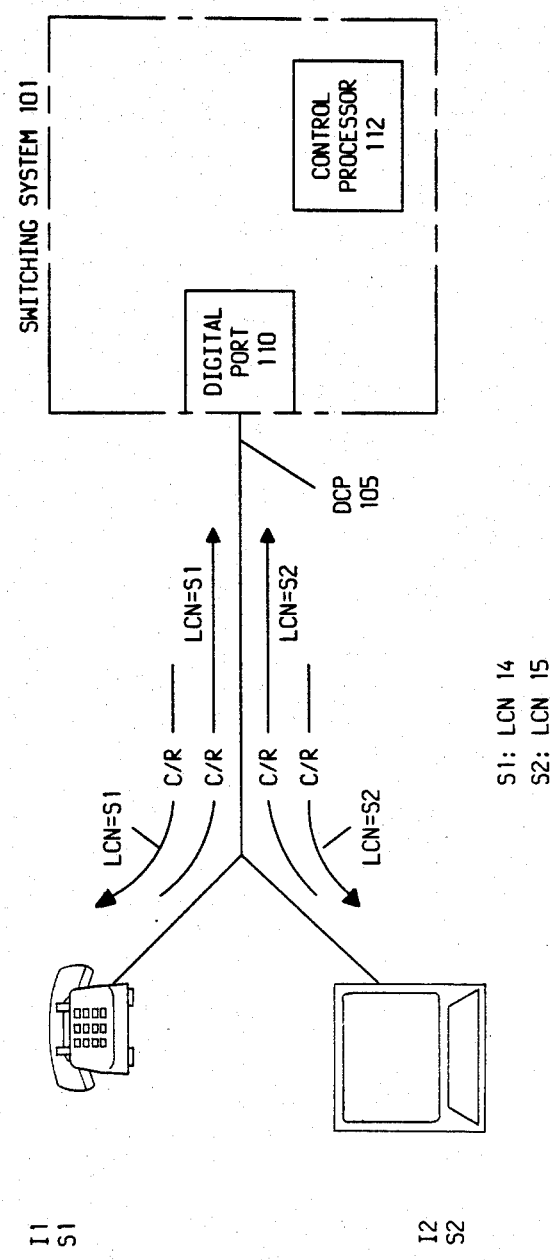
FIG. 10 discloses the manner in which the modified HDLC address field is used.

FIGS. 9 and 10 disclose how multiplexing is used on S channel messages to permit the processor selectively to exchange information with either the terminal or the telephone connected to the station end of a given line. FIG. 3 discloses a typical HDLC frame format having a plurality of fields including an address field. The purpose of the address field, as defined in the HDLC standard (asynchronous balanced mode), is to identify a frame as either a command or a response. A command frame typically contains the address of the endpoint to which the command is being sent. A response frame contains the address of the endpoint sending the response.

FIG. 9 discloses further details of an HDLC address field modified in accordance with the present invention. The address field comprises an extended address (EA) bit in bit position 0, a command/response (C/R) bit in position 1, a pair of bits set to 0 in positions 2 and 3, and a logical channel number (LCN) field in bit positions 4, 5, 6, and 7. The purpose of the logical channel number is to specify a multiplexed channel used on an S field message transmitted over an associated path 105 of FIG. 1. The four bit positions provide for up to 16 logical call channels. This would permit the processor to separately address 16 different terminal devices at the station side of a line 105. However, only two encoded numbers in the LCN field are used in the system of the present invention since only two terminal devices are connected at the station end of an associated line 105. In the present invention, an LCN of decimal 14 encoded in bits 4-7 identifies a device S1 which is the telephone using the I1 field at the associated station. An LCN of decimal 15 encoded in bits 4-7 identifies a device S2 which is the terminal using the I2 field at the associated station. Thus, when a processor transmits a command to one or the other devices at a station, it inserts a decimal 14 in the LCN field to transmit to the telephone and uses a channel number of 15 to transmit to the terminal.

The command/response (C/R) bit indicates to the receiving end of an S field message whether a transmitted message is a command for the receiving end to perform a specified function or, alternatively, whether it is a response transmitted by a receiving device generally in response to a priorly received command. A value of 1 for this bit indicates a command. A value of 0 indicates a response to a command. The EA field is always set to 1 in the present invention to maintain HDLC compatibility and to indicate that extended addressing is not currently desired. This bit, as well as bits 2 and 3, performs no function pertinent to the present invention.

FIG. 10 portrays pictorially the manner in which channel addressing is provided on commands and responses of the type shown in FIG. 9. FIG. 10 shows a line 105 of the type shown in FIG. 1 having a terminal and a telephone connected at the station end of the line on the left and the switching system on the right side of the line. The telephone is termed the S1 device and uses the I1 field. The data terminal is the S2 device and uses the I2 field. Any message exchanged between the processor and the station has an LCN of 14 for the telephone and an LCN of 15 for the terminal. Thus, when the system processor sends a command to the telephone, it inserts a channel number of 14 into the LCN portion of the modified HDLC address field and sets the command/response bit to 1 to indicate a command. The telephone responds to the command by transmitting a response to the processor using a channel number of 14 in the LCN portion of the address field and a 0 in the command/response bit. Messages are sent to and from the terminal in the same way using an LCN of 15.

Throughout this specification the station equipment connected to the lines 105 have been referred to as being a telephone 102 and a terminal 103. This description is not limiting and is merely exemplary to portray typical uses to which the system of our invention may be put. Obviously, if desired, the station devices at any station connected to the associated line 105 could be two terminals 103 or, alternatively, two telephones 102, rather than a terminal and a telephone as shown on FIG. 1. Regardless of the nature of the two devices at a station, one device uses the I1 field to send its data to the switching network over path 105 while the other device uses the I2 field.

What is claimed is:

1. In a stored program controlled communication system having a processor, a plurality of ports connected by lines to associated stations and a switch for controllably interconnecting said ports, said system further comprising:
   means in each port for receiving from an associated station time multiplexed information in the form of cyclically reoccurring frames wherein each frame has a plurality of fields including an information (I) field and a signalling (S) message field,
   means in each port for applying the I field information of each received frame to said switch for extension to another port,
   means in each port for assembling the received S field bits of successive frames into groups to form signalling messages,
   a receive register in each port,
   means in each port for entering each signalling message formed within said port into said receive register of said port,
   means in each port responsive to the presence of a signalling message in said receive register of said port for generating a port data ready signal,
   said processor being operative for cyclically scanning said ports for the presence of a data ready signal,
   said processor being further operative in response to the presence of a data ready signal in a scanned port for applying a read signal to said scanned port, and
   means in a scanned port responsive to the receipt of a read signal from said processor for applying a signalling message currently in said receive register of said port to said processor.

2. The system of claim 1 wherein said formed message has a message information field plus at least one protocol support field, said last named means for applying including means for applying all fields of said formed message, including said protocol support field, to said processor in response to the receipt of said read signal by said port from said processor.

3. The system of claim 2 wherein each port further includes:
   a multibit status register for receiving information regarding circuit elements of said port,
   means for receiving a status register read signal from said processor, and
   means responsive to the receipt of a status register read signal by said port from said processor for applying the current contents of said status register to said processor.

4. The system of claim 3 in combination with means for applying information to a first bit position of said status register indicating the presence of a formed signalling message in said receive register.

5. The system of claim 4 in combination with means for applying to a second position of said status register information indicating that the next information received from said receive register is the last character of a formed signalling message.

6. The system of claim 5 in combination with means for applying to a third position of said status register information indicating that a continuous stream of ones (1's) is being received in the signalling messages formed from the S field of currently received frames as an indication that equipment at an associated station is not currently operable.

7. The system of claim 6 in combination with means for preventing defective port circuitry from generating a data ready signal when no formed signalling messages are currently contained within said receive register.

8. The system of claim 2 or 7 in combination with:
   means in each port for generating time multiplexed information in the form of cyclically reoccurring frames wherein each frame has a plurality of fields including an information (I) field and a signalling (S) message field,
   means at each port for receiving information from said switch and for applying said information to the I field of each frame generated by said port,
   means in each port for receiving signalling messages from said processor,
   a transit register in each port,
   means for writing each signalling message received by a port from said processor into said transmit register of said port,
   means responsive to the presence of a signalling message in said transmit register for applying said signalling message in said transmit register to a transmit formatter,
   means in said transmit formatter for inserting the bits of said last named message serially into the S field of successive frames generated by a port, and
   means for transmitting the successive frames generated by a port over an associated line to an associated station.

9. The system of claim 8 in combination with means for generating a signal indicating that said port transmit register is full and cannot accept further information from the port write means and means for transmitting said transmit register full information to said processor.

10. A method of operating a stored program controlled communication system having a processor, a plurality of ports connected by lines to associated stations and a switch for controllably interconnecting said ports, said method comprising the steps of;
   (1) receiving within a port time multiplexed information from an associated station with said information being in the form of cyclically reoccurring frames wherein each frame has a plurality of fields including an information (I) field and a signalling (S) message field,
   (2) applying the I field information of each received frame from a port to said switch for extension to another port,
   (3) assembling the received S field bits of successive frames received by a port into groups to form signalling messages within said port,
   (4) entering each signalling message formed within a port into a receive register of said port,
   (5) generating a port data ready signal in response to the presence of a formed signalling message in said receive register of said port, said processor being operative for cyclically scanning said ports for the presence of a data ready signal, said processor being further operative in response to the presence of a data ready signal in a scanned port for applying a read signal to said scanned port, and
   (6) applying a formed signalling message currently in said port receive register to said processor in response to the receipt of a read signal by said port from said processor.

11. The method of claim 10 wherein said formed message has a message information field plus at least one protocol support field and wherein said method further comprises the step of applying all fields of said formed signalling message, including the protocol support field, to said processor in response to the receipt of said read signal by said port from said processor.

12. A method of operating a stored program controlled communication system having a processor, a plurality of ports connected by associated lines to associated stations and a switch for controllably interconnecting said ports, said method comprising the steps of;
   (1) receiving within a port time multiplexed information from an associated station with said information being in the form of cyclically reoccurring frames wherein each frame has a plurality of fields including an information (I) field and a one bit signalling (S) message field,
   (2) applying the I field information of each frame received by a port to said switch for extension to another port,
   (3) converting the serially received S field bits of successive frames received by a port from a serial to a parallel format to form a multibyte signalling message duplicating that generated at the associated station and transmitted over an associated line to said port,
   (4) entering each signalling message formed within a port, byte by byte, into a receive FIFO of said port,
   (5) generating a port data ready signal in response to the presence of said formed signalling message in said receive FIFO, said processor being operative for cyclically scanning said ports for the presence of a data ready signal, said processor being further operative in response to the presence of a data ready signal in a scanned port for applying a read signal to said scanned port, and
   (6) applying said formed signalling message currently in said receive FIFO of said port to said processor in response to the receipt of a read signal by said port from said processor.

13. The method of claim 12 wherein said formed signalling message is in a modified HDLC protocol and has a message information field plus at least one protocol support field, said method including the further step of applying all fields of said formed signalling message, including the protocol support field, to said processor in response to the receipt of said read signal by said port from said processor.

14. The method of claim 13 in combination with the additional steps of:
   (1) generating time multiplexed information in each port in the form of cyclically reoccurring frames wherein each frame has a plurality of fields including an information (I) field and a one bit signalling (S) message field,
   (2) receiving information from said switch and applying said information to the I field of each frame generated by said port,
   (3) applying signalling messages to a port from said processor,
   (4) entering each signalling message received by a port from said processor into a transmit register of said port,
   (5) applying each signalling message in said transmit register to a port transmit formatter,
   (6) converting each of said signalling messages in said transmit formatter from a parallel to a serial format,
   (7) inserting the bits of each converted signalling message serially into the S field of successive frames generated by said port, and
   (8) transmitting said last named message, bit by bit, in the S field of successive frames from said port over an associated line to an associated station.

15. In a stored program controlled communication system having a processor and a switching module including a switch and a plurality of ports connected via associated lines to associated stations with each station being operable for transmitting data to said module in the form of cyclically reoccurring frames having an I field and a signalling (S) message field,
   each station also being operable for generating a multibit signalling message including protocol support data, and for transmitting each signalling message to an associated port by inserting the bits of each signalling message serially bit by bit into the S field of successive frames,
   means in each port for receiving the transmitted frame information including said protocol support data from its associated station,
   means in each port for passing received I field information of each frame to said switch for extension to another port,
   means in each port for converting the received S field information of successive frames from a serial to a parallel format to regenerate each transmitted signalling message,
   a port FIFO in each port for storing at least one regenerated signalling message,
   said processor being operable for cyclically scanning said ports to determine the presence of a regenerated signalling message in a port FIFO, said processor also being operable to apply a read signal to each scanned port currently containing a regenerated signalling message, and means in each port responsive to the reception of a read signal for applying a regenerated signalling message in its FIFO including said protocol support data to said processor.

16. In a stored program controlled communication system having a processor, a plurality of ports connected by associated lines to associated stations and a switch for controllably interconnecting said ports, said system further comprising;

means in each port for receiving from an associated station time multiplexed information in the form of cyclically reoccurring frames wherein each frame has a plurality of fields including an information (I) field and a one bit signalling (S) message field, means in each port for applying the I field information of each received frame to said switch, said switch being effective for controllably extending said I field information to another port, means in each port for converting the serially received S bits of successive frames from a serial to a parallel format to form a multibyte signalling message duplicating that generated at the associated station and transmitted over an associated line to said port, a receive FIFO in each port, means in each port for entering each signalling message formed within said port, byte by byte, into said receive FIFO of said port, means responsive to the presence of said formed signalling message in said receive FIFO for generating a port data ready signal, said processor being operative for cyclically scanning said ports for the presence of a data ready signal, said processor being further operative in response to the presence of a data ready signal in a scanned port for applying a read signal to said scanned port, and means in a scanned port responsive to the receipt of a read signal from said processor for applying said formed signalling message currently in said receive FIFO of said scanned port to said processor.

17. The system of claim 16 wherein said formed signalling message is in a modified HDLC protocol and has a message information field plus at least one protocol support field, said means for applying including means for applying all fields of said formed signalling message, including the protocol support field, to said processor in response to the receipt of said read signal by said port from said processor.

18. The system of claim 17 wherein each port further includes;

a multibit status register for receiving information regarding circuit elements of said port, means for receiving a status register read signal from said processor, and means responsive to the receipt of a status register read signal by said port from said processor for applying the contents of said status register over an I/O bus to said processor.

19. The system of claim 18 in combination with means for applying to a first bit position of said status register information indicating the presence of a formed signalling message in said port receive FIFO.

20. The system of claim 19 in combination with means for preventing defective port circuitry from generating a data ready signal when no formed signalling messages are currently contained within said receive FIFO.

21. The system of claim 20 in combination with means for applying to a second position of said register information indicating that a continuous stream of ones (1's) is being received in the signalling messages formed from the S field of currently received frames as an indication that equipment at an associated station is not currently operable.

22. The system of claim 18 or 21 in combination with means for applying to a third position of said status register information indicating that the next information character received from said receive FIFO is the last character of a received formed signalling message.

23. The system of claim 17 in combination with:

means in each port for generating time multiplexed information in the form of cyclically reoccurring frames wherein each frame has a plurality of fields including an information (I) field and a one bit signalling (S) message field, means at each port for receiving information from said switch and for applying said information to the I field of each frame generated by said port, means in each port for receiving signalling messages from said processor, a transmit FIFO in each port, means for writing each signalling message received by a port from said processor into the transmit FIFO of said port, means responsive to the presence of a signalling message in said transmit FIFO for applying said message in said transmit FIFO to a transmit formatter, means in said transmit formatter for converting each of said applied signalling messages from a parallel to a serial format and for inserting the serial bits of each converted signalling message into the S field of successive frames generated by a port, and means for transmitting said converted signalling message, bit by bit, into the S field of successive frames generated by a port over an associated path to an associated station.

24. The system of claim 23 in combination with means for generating a signal indicating that the transmit FIFO is full and cannot accept another character from the port write means, and means for transmitting said FIFO full signal to said processor.

25. A method of operating a stored program controlled communication system having a processor, a plurality of ports connected by lines to a plurality of associated stations each of which has a plurality of station devices, and a switch for controllably interconnecting said ports, said method comprising the steps of;

(1) generating at each station time multiplexed information in the form of cyclically reoccurring frames wherein each frame has a plurality of fields including an information (I) field unique to each associated station device and a signalling (S) field, (2) generating S field signalling messages at each station device using a modified HDLC protocol wherein each signalling message has a plurality of fields including an address field, (3) writing in the address field of each signalling message a bit value specifying whether the message represents a command or a response to a command priorly received at said station device, (4) writing in said address field of a generated signalling message a bit value specifying an address assigned to the device generating said signalling message, (5) inserting the bits comprising each signalling message generated at a station device into the S field of successive multiplexed frames, (6) transmitting said multiplexed frames over an associated line from each station to an associated port, (7) applying the I field information of each frame received by a port to said switch for extension to another port, (8) assembling the S bits of successive frames received by a port into groups to reconstruct the signalling messages generated at the associated station, (9) entering each reconstructed signalling message into a port receive register,

(10) generating a port data ready signal in response to the presence of a reconstructed signalling message in said receive register, said processor being operative for cyclically scanning said ports for the presence of a data ready signal, said processor being further operative in response to the presence of a data ready signal in a scanned port for applying a read signal to said scanned port, and

(11) applying a reconstructed signalling message currently in said receive register to said processor in response to the receipt of a read signal from said processor.

26. The method of claim 25 wherein said reconstructed signalling message has a message information field and said address field plus at least one protocol support field and wherein said method further comprises the step of applying all fields of said message, including said protocol support field, to said processor in response to the receipt of said read signal by said port from said processor.

27. A method of operating a stored program controlled communication system having a processor, a plurality of ports connected by lines to a plurality of associated stations each of which has a plurality of station devices, and a switch for controllably interconnecting said ports, said method comprising the steps of;

(1) generating at each port and at each station time multiplexed information in the form of cyclically reoccurring frames wherein each frame has a plurality of fields including an information (I) field unique to each associated station device and a signalling (S) field, (2) generating S field signalling messages at each port under control of a processor and at each station device using a modified HDLC protocol wherein each signalling message has a plurality of fields including an address field, (3) writing in the address field of each S field signalling message a bit value specifying whether the signalling message represents a command generated by a port under control of said processor and directed to a station device or represents a response to a command priorly received by a station device, (4) writing in said address field a bit value specifying an address assigned to the station device to which a command message is directed or specifying the station device generating a response message, (5) inserting the bits comprising each generated signalling message into the S field of successive multiplexed frames generated by a station or by a port under control of said processor, (6) transmitting said multiplexed frames over an associated line between each station and an associated port, (7) applying the I field information of each frame received by a port to said switch for extension to another port, (8) applying the I field of each frame received at a station to the station device associated with each I field of each received frame, (9) assembling the S bits of successive frames received by said station and said ports into groups to reconstruct each generated S field signalling message,

(10) applying each reconstructed signalling message received by a station device to control circuitry of said device to effect a specified device function,

(11) entering each signalling message reconstructed within a port into a port receive register,

(12) generating a port data ready signal in response to the presence of a reconstructed signalling message in said receive register, said processor being operative for cyclically scanning said ports for the presence of a data ready signal, said processor being further operative in response to the presence of a data ready signal in a scanned port for applying a read signal to said scanned port, and

(13) applying a reconstructed signalling message currently in said receive register to said processor in response to the receipt of a read signal from said processor.

* * * * *